July 26, 1949.　　　　G. J. KOEHLER　　　　2,477,186
CONTROL VALVE FOR FLUIDS
Filed May 4, 1946

Inventor
GUSTAVE J. KOEHLER
By Richard Van Busum
HIS Attorney

Patented July 26, 1949

2,477,186

UNITED STATES PATENT OFFICE 2,477,186

CONTROL VALVE FOR FLUIDS

Gustave J. Koehler, Dayton, Ohio

Application May 4, 1946, Serial No. 667,407

2 Claims. (Cl. 137—104)

The present invention relates to fluid flow control valves and is particularly directed to a float-controlled valve for automatically terminating the flow of fluid into a receptacle when said receptacle is filled to the desired level with said fluid.

One object of the present invention is to provide a valve which functions automatically to control the flow of fluid from a supply source to a storage receptacle.

Another object is the provision of a novel fluid control valve which operates automatically to regulate the volume of fluid being introduced under pressure into a container, said valve being controlled by the level of the fluid in said container and operated by the pressure of the incoming fluid.

Another object is to provide a fluid control valve which operates automatically when fluid flowing under pressure into a container reaches a predetermined level in said container, said valve being controlled for operation by the level of said fluid in said container and operated by the pressure of the incoming fluid.

A further object of the present invention is to provide a novel valve for automatically controlling the volume of fluid being introduced under pressure into a container, said valve being rendered operative by a pilot valve which is actuated by the level of the fluid in said container, and, after being rendered operative, said valve is operated by the pressure of the incoming fluid.

With these and incidental objects in view, the invention includes certain novel features of construction and combinations of parts, the essential elements of which are set forth in appended claims and a preferred form or embodiment of which is hereinafter described with reference to the drawing which accompanies and forms a part of this specification.

Description

The present invention is directed to a novel type of control valve which may be used in connection with a fluid container for controlling the amount of fluid introduced into said container from an external source of supply. One example of use of this invention may be on a storage tank for storing liquid fuel, said tank arranged to be filled when necessary from external sources, such as tank trucks, tank cars, or the like.

Figure 1:
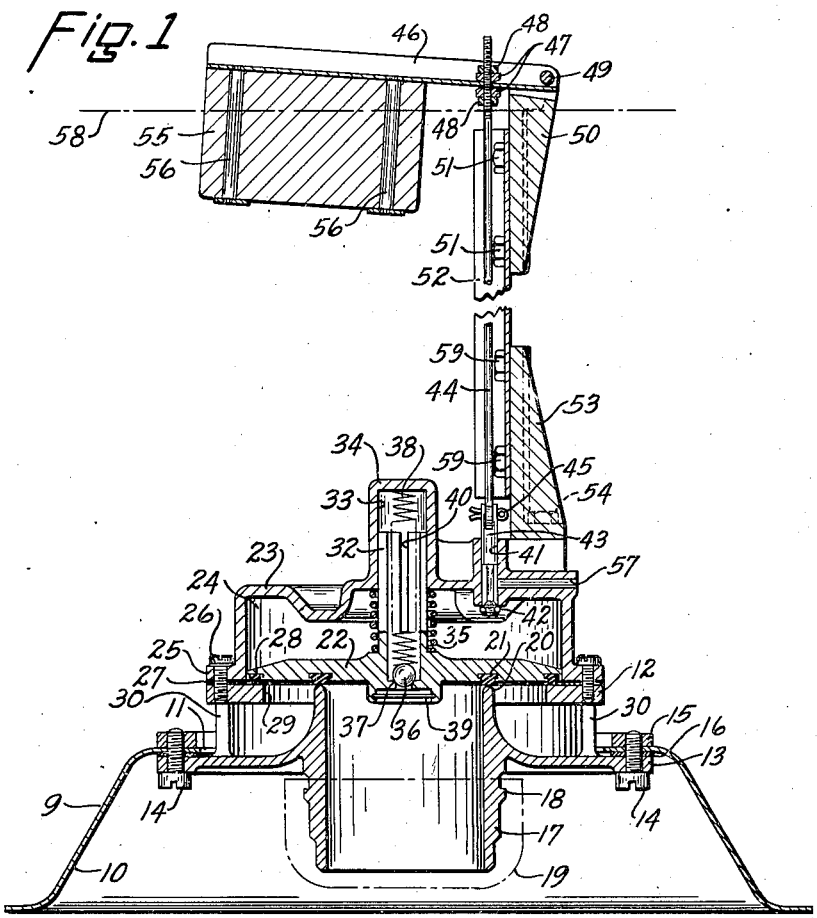
Fig. 1 is a side elevation of the complete valve, said view being cross-sectioned to better show the interior parts of said valve and their relationship to each other and to the exterior parts of said valve.
Figure 2:
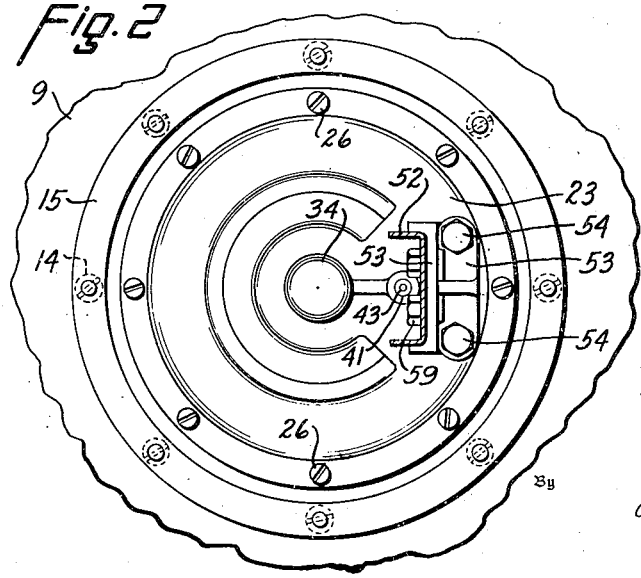
Fig. 2 is a top plan view of the lower portion of the valve to better show the shape of certain parts thereof.

Directing attention to Fig. 1 of the drawing, the reference numeral 9 represents a cross-sectional view of a segmental portion of the bottom of any suitable tank or container capable of receiving and storing a supply of fluid. The bottom of the tank 9 has a cup-shaped depressed portion 10, having therein a round opening 11, through which extends a substantially round body portion 12 of a fluid-control valve. The body portion 12 has a lower flange 13, which is clamped to the bottom face of the depression 10 by a plurality of screws 14, which threadedly engage corresponding holes in a ring 15 secured by spot-welding, or other suitable means, to the upward face of the depression 10. A sealing washer or gasket 16 is interposed between the flange 13 and the bottom face of the depression 10 to form a liquid seal between said flange and said face. The flange 13 supports a centrally located neck 17, a downwardly extending portion of which has thereon a connecting shoulder 18 for suitably coupling a hose thereto from a fluid supply source. A cap 19, having suitable connections for engaging the connecting shoulder 18 on the neck 17, may be used to close the opening to said neck when the supply hose is not connected thereto.

An upwardly extending portion of the neck 17 (Fig. 1) is rounded on its edge to form a valve seat 20, which cooperates with a valve seat ring 21 formed of suitable resilient material, such as synthetic rubber, which is molded into a T-shaped circular groove in the bottom face of the head of a poppet-type valve member 22. The periphery of the head of the valve member 22 fits snugly in the cylindrical interior portion of a valve cap 23, said cylindrical interior forming a fluid chamber 24. The bottom face of a flange portion 25 of the cap 23 is secured against the upward face of the body 12 by a plurality of screws 26. A sealing washer 27 is interposed between the bottom face of the flange 25 and the upper face of the body 12 to form a fluid seal between said faces. The bottom face of the head of the valve member 22 has therein a T-shaped circular groove in which is molded a plastic ring 28, similar to the ring 21, made of suitable material, such as synthetic rubber, which cooperates with the upper face of the valve body 12.

When the valve head 22 is in closed position, as shown here, the ring 28, in cooperation with its companion ring 21, forms a fluid seal between the opening in the neck 17 and a circular opening 29, formed by the upper end of the neck 17 and the upper flanged portion of the body 12, which forms a seating surface for the ring 28. The opening 29 is connected by a series of openings or ports 30 to the interior of the tank 9 and, in cooperation with the circular opening 29 and the chamber 24, forms a fluid connection between the interior of said tank 9 and the opening in the neck 17 for the purpose of introducing fluid into said tank.

The head of the valve member 22 has extending upwardly therefrom a hollow steam 32, the external circumference of which snugly engages a bore 33 in a dome-shaped portion 34 extending upwardly from the cap 32, said bore 33 being concentric with the interior circumference of said cap 23. A compressible spring 35 loosely encircles the stem 32 and is compressed between the upper surface of the chamber 24 and the head of the valve member 22 to urge said valve member downwardly to normally maintain the seating rings 21 and 28 in yielding engagement with their corresponding seating surfaces.

The hollow interior of the valve stem 32 has near its lower end a conical seating surface 37 engaged by a check ball 36, which is urged into yielding engagement with said seat 37 by a comparatively weak compressible spring 38, which spring fits loosely in the hollow interior of the stem 32 and is compressed between the top of the dome 34 and the check ball 36. The valve seat 37 is protected against the entrance of foreign matter by a fine-mesh screen 39 secured in a counter-bore which is concentric with said valve seat 37. A plurality of slots 40 in the upper end of the stem 32 form a fluid connection between the hollow interior of said stem and the chamber 24.

The valve cap 23 has in its upper portion an opening 41, the surface adjacent to the lower edge of which opening forms a valve seat arranged to be engaged by a plastic sealing ring 42 mounted in a groove in the lower end of a pilot valve plunger 43, which slidably engages the opening 41. The upper end of the plunger 43 is slotted to receive an eye formed on the lower end of an operating rod 44. A cotter key 45, in cooperation with a through hole in the upper end of the plunger 43 and the eye on the rod 44, forms a loose operating connection between said rod 44 and said plunger 43. The threaded upper end of the rod 44 passes through a clearance opening in a channel-shaped arm 46. Opposite faces of the arm 46 are engaged by the opposed rounded surfaces of nuts 47 threaded on the upper end of the rod 44 and secured in place by corresponding lock nuts 48 also threaded on the upper end of said rod 44 to form an adjustable operating connection between said rod and said arm 46. The arm 46 is pivotally connected by a hinge pin 49 to a bracket 50 secured by suitable bolts 51 to a channel-shaped bar 52, the lower end of which bar is secured by suitable bolts 59 to a bracket 53 in turn secured by bolts 54 to a finished upper surface on the cap 19. A float 55, formed of suitable material, such as cork, is secured to the bottom face of the arm 46 by suitable studs 56.

The pilot valve opening 41 (Fig. 1) is connected by a suitable opening 57 to the interior of the tank 9, and an undercut portion of the plunger 43 provides suitable clearance for the unobstructed flow of fluid through said openings 41 and 57, when the pilot valve is open. The pilot valve openings 41 and 57 form a fluid connection between the interior of the chamber 24 and the interior of the tank 9 to control the pressure within said chamber to effect proper functioning of the valve, as will be explained presently.

When the tank 9 is properly filled with fluid to the level indicated by the dot-and-dash line 58 (Fig. 1), the float 55 and the arm 46 are raised as shown here and, through the rod 44, retain the plunger 43 in its upward position, as shown here, to maintain the sealing ring 42 against the seat adjacent the opening 41 to seal said opening and its companion opening 57 from the chamber 24. When the tank 9 is empty, or when the level of the fluid therein drops substantially beneath the float 55, said float and the arm 46 move downwardly or counter-clockwise, which movement, through the rod 44, shifts the plunger 43 downwardly to move the sealing ring 42 away from the seat to connect the chamber 24 to the interior of the tank 9, so that pressure cannot build up in said chamber. This equalizes the pressure within the chamber 24 and the pressure within the tank 9, and in this case the spring 35 firmly maintains the sealing rings 21 and 28 in contact with their corresponding sealing surfaces to in turn seal the interior of the neck 17 against the leakage of fluid through the ports 30 and the opening 29. Likewise the check ball 36, in cooperation with the seat 37, prevents the leakage of fluid between the chamber 24 and the opening in the neck 17.

When the level of the fluid is low in the tank 9 and the pilot valve 43 is open, as explained above, the introduction of fluid under pressure, through the interior of the neck 17, by suitable connections to a fluid supply source, forces the valve member 22 upwardly against the action of the spring 35, to lift the sealing rings 21 and 28 from their respective sealing surfaces to connect the interior of the tank 9 with the interior of the neck 17, so that fluid may flow through said neck into said tank for the purpose of filling it. The tank 9 is provided with a suitable air vent at its top to permit the escape of air while said tank is filling with fluid.

When the incoming fluid reaches the desired level, as indicated by the dot-and-dash line 58, the float 55 rocks the arm 46 clockwise to lift the rod 44 and the plunger 43 to engage the ring 42 with the seat formed by the lower edge of the opening 41, to seal said opening from the chamber 24. This sealing of the chamber 24 from the interior of the tank 9 permits the incoming fluid, which passes the check ball 36 and through the hollow interior of the stem 32, to quickly build-up pressure within the chamber 24 to the point where such pressure, in combination with the spring 35, shifts the valve member 22 downwardly to closed position, as shown here, to seal the interior of the neck 17 against the introduction of more fluid.

Subsequent lowering of the level of the fluid within the tank 9, and the coincident opening of the pilot valve 43, which immediately equalizes the pressure within the chamber 24 and within the tank 9, do not unseat the valve member 22, which is retained by the spring 35 in closed position, as shown here, until fluid under pressure is again introduced through the neck 17, as explained above.

The cap 19 (Fig. 1), in addition to sealing the interior of the neck 17 against the entrance of foreign matter, likewise forms an additional fluid seal between the interior of said neck and the interior of the tank 9 to further insure against the leakage of fluid from said tank.

From the foregoing description it may be clearly seen that applicant's novel flow control valve permits the filling of fluid containers to the proper level and further insures that said containers will be filled to the proper level, thereby doing away with the close supervision of such filling by an attendant and eliminating the errors associated with such supervision, such as not putting sufficient fluid in the container or running said container over, either of which errors may prove dangerous or disastrous in case the tank 9 is used for the storing of highly volatile fuel.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a fluid valve of the class described for use in a fluid container to control the quantity of fluid introduced under pressure into said container, the combination of a main casing having a sealed connection with the container and comprising a central portion with a main inlet passage therein, a flat upper surface with a circular opening encircling the central portion and being in the same plane as the upper end of said portion, and ports connecting said circular opening with the container; a valve cap having a sealed connection with the flat upper surface of the main casing and having a round hollow interior which is in axial alinement with and encircles the circular opening to form a connecting chamber between the main inlet passage and said circular opening for the passage of fluid therethrough; a dome formed on the cap and having a bore closed at its upper end and concentric with the hollow interior of said cap; a valve member having an enlarged head operating in the round hollow interior of the chamber and disposed opposite the main inlet passage so as to be exposed to the pressure of the incoming fluid, said valve member having a stem operating in the bore; concentric seating rings mounted in the downward face of the valve head and coacting with corresponding seating surfaces formed on the upper end of the central portion and the flat upper surface; a spring encircling the stem and normally effective to maintain the seating rings in yielding engagement with the seating surfaces to close the valve; a fluid passage formed in the valve stem and connecting with the main inlet; slots in the valve stem to connect the fluid passage with the chamber; a relief passage in the cap to connect the chamber with the container; and a float-operated pilot valve in the relief passage and responsive to the level of the fluid in the container to open the pilot valve when the level of the fluid is low and to close said pilot valve when the fluid has raised to the desired level, whereby the pressure of the incoming fluid against the valve head opens the valve member against the action of the spring when the pilot valve is open, and whereby the incoming fluid entering the chamber through the passage in the stem builds up pressure in said chamber when the pilot valve is closed, which pressure combined with the action of the spring closes the valve member to terminate the flow of incoming fluid.

2. In a fluid valve of the class described for use in connection with a fluid container to admit and control the quantity of fluid introduced under pressure into said container, the combination of a main body portion having a sealed connection with the container and having a flat upper surface with a circular inlet opening therein, said opening connecting with the container; a cylindrical portion integral with the body portion and having a main inlet passage therein, said portion being disposed centrally with respect to the circular opening and having its upper edge on a plane with the flat upper surface; a cap having a sealed connection with the flat upper surface and forming a connecting chamber between the main inlet passage and the circular opening for the flow of fluid therethrough; a dome-shaped extension on the cap with a counterbore disposed substantially centrally with relation to the main inlet opening; a valve member operating within the chamber, said member having a stem portion operating within the counterbore; spaced annular sealing rings carried by the valve member and coacting with the upper flat surface and the upper edge of the cylindrical portion to close them against the entrance of fluid when said member is in closed position; yieldable means encircling the stem and coacting with the valve member to yieldingly maintain it in closed position; a fluid passage in the valve stem connecting with the main inlet; slots in the valve stem to connect the passage with the chamber; a check valve in the passage and effective to permit the flow of fluid from the main inlet opening into the chamber; a relief fluid passage in the cap connecting the chamber to the container; a pilot valve mounted in the relief passage; and a float supported by the cap and disposed within the container and operatively connected with the pilot valve, said float responsive to the level of the fluid in said container to open the pilot valve when the fluid level is low and to close said pilot valve when the fluid has raised to the desired level, whereby the pressure of the incoming fluid forces open the valve member against the action of the yieldable means, when said pilot valve is open, and whereby said incoming fluid entering the chamber through the passage in the stem builds up pressure in said chamber when the pilot valve is closed, which pressure combined with the action of the yieldable means closes the valve member to terminate the flow of the incoming fluid.

GUSTAVE J. KOEHLER.

REFERENCES CITED

The following references are of record in the file of this patent:

UNITED STATES PATENTS

| Number | Name | Date |
| --- | --- | --- |
| 595,061 | Gulland | Dec. 7, 1897 |
| 654,522 | Cowey | July 24, 1900 |
| 1,004,650 | Hilton | Oct. 3, 1911 |
| 2,211,237 | Langdon | Aug. 13, 1940 |
| 2,426,900 | Parker | Sept. 2, 1947 |

FOREIGN PATENTS

| Number | Country | Date |
| --- | --- | --- |
| 347,338 | France | 1905 |